Patented Sept. 4, 1951

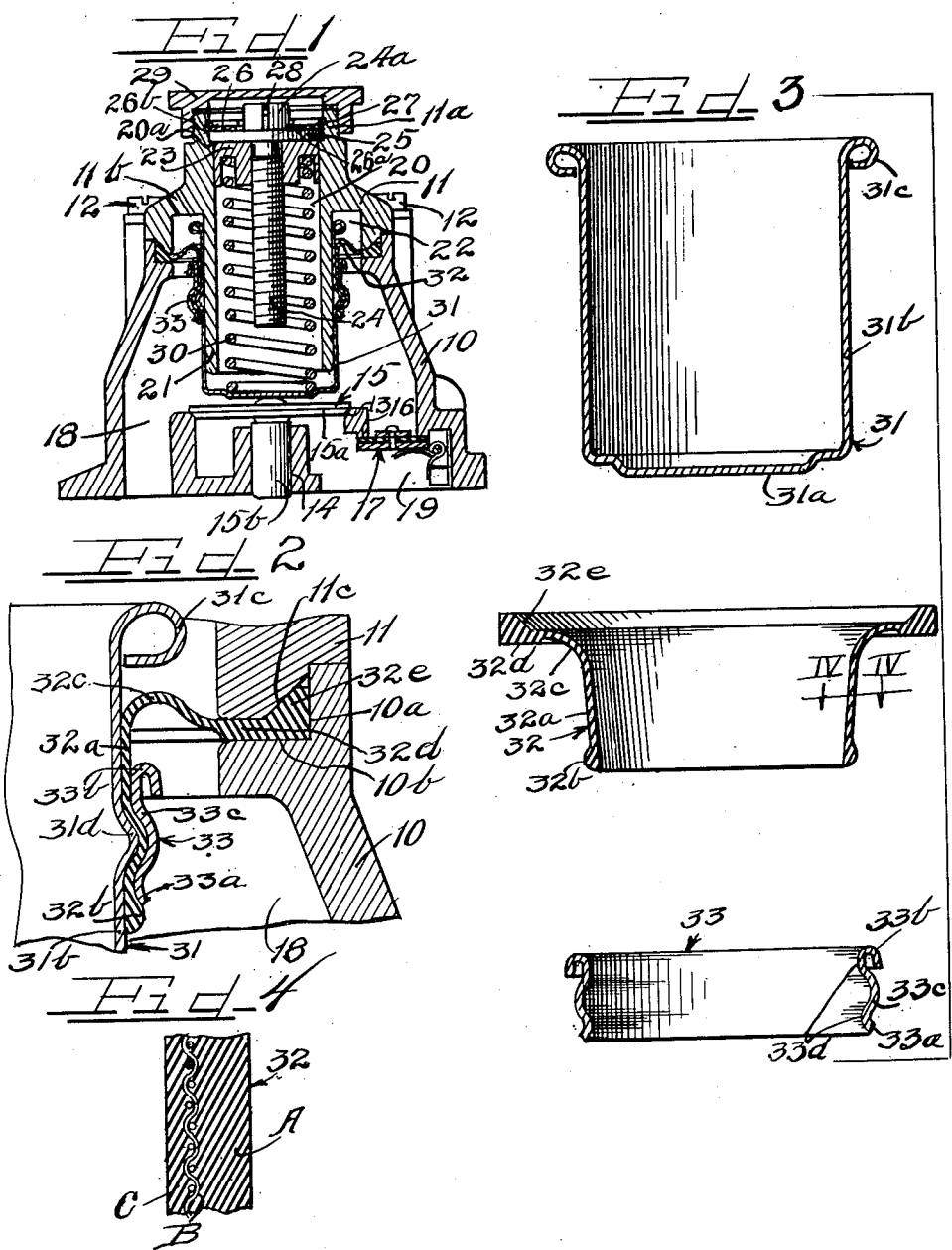

2,567,071

UNITED STATES PATENT OFFICE 2,567,071

BALANCED VALVE DIAPHRAGM ASSEMBLY

Harland E. Jacobus, University Heights, Ohio, assignor to Thompson Products, Inc., Cleveland, Ohio, a corporation of Ohio Application October 19, 1944, Serial No. 559,375

4 Claims. (Cl. 137—53)

This invention relates to a balanced relief valve diaphragm assembly adapted for fuel and water injection pumps for fuel and water injection systems.

Specifically, the invention relates to a diaphragm assembly for an aircraft fuel pump relief valve.

In the Russell R. Curtis Patent No. 2,268,807, granted January 6, 1942, there is disclosed and claimed a relief valve assembly including a flexible diaphragm anchored around its outer peripheral portion between pump casing parts and having its inner peripheral portion spun into a cup member.

The present invention now provides a relief valve diaphragm assembly similar to that disclosed in the Curtis Patent 2,268,807 but embodying a very thin diaphragm secured in sealing relation to a cup member between a beaded side wall portion of the cup member and a retaining collar.

The diaphragm assembly of the instant invention is interchangeable with the diaphragm assembly of the Curtis Patent 2,268,807 and will operate efficiently throughout a wide temperature range of from +160° F. to —65° F. without objectionably upsetting the balanced condition of the valve.

The diaphragm of the instant invention, composed of synthetic rubber capable of withstanding aromatic fuel and retaining its flexibility at very low temperatures, is reinforced by nylon fabric. Since flexibility of a diaphragm depends upon the length, thickness, and unit physical properties of the diaphragm, the required flexibility of the diaphragm of the instant invention is obtained by increasing the length of the flexing section, decreasing the thickness of the diaphragm, and adding nylon fabric to give it strength against bursting pressures.

It is an object of this invention to provide a diaphragm assembly for aircraft fuel pump relief valves that is interchangeable with the diaphragm assembly of Curtis Patent No. 2,268,807 and operates more efficiently at low temperatures than the diaphragm assembly of said patent.

A further object of the invention is to provide a relief valve diaphragm assembly for aircraft fuel pumps which maintains a high degree of flexibility throughout a wide range of temperatures.

A still further object of the invention is to provide a diaphragm assembly for aircraft fuel pumps which permits free actuation of the relief valve of said pump even at very low temperatures.

A still further object of the invention is to provide a very thin, flexible diaphragm assembly which has a high resistance to bursting pressures.

Another object of the invention is to provide a very thin diaphragm assembly having high fatigue resistance when repeatedly flexed under pressure.

Another object of the invention is to provide a diaphragm and cup assembly which is readily produced with a minimum of effort and a maximum degree of efficiency.

A still further object of the invention is to sealingly unite a cup member for an aircraft pump relief valve with a flexible diaphragm sheet by expanding the cup member to clamp the diaphragm between the cup member and a preformed sealing ring.

Another object of the invention is to decrease the cost of connecting flexible diaphragms with metal members while at the same time increasing the sealing efficiency between the diaphragms and said members.

Other and further objects of the invention will be apparent to those skilled in the art from the following detailed description of the annexed sheet of drawings which, by way of preferred example only, illustrates one embodiment of the invention.

On the drawings:

Figure 1 is a vertical cross-sectional view of a portion of a fuel pump, with parts in elevation, illustrating the details of construction of the diaphragm and valve spring cup for the balanced relief valve of the pump.

Figure 2 is a greatly enlarged fragmentary vertical cross-sectional view of a portion of the fuel pump shown in Figure 1 to better illustrate the connections between the diaphragm and the cup.

Figure 3 is an exploded vertical cross-sectional view of the cup, diaphragm and sealing ring before the same are assembled.

Figure 4 is a magnified fragmentary sectional view taken along the line IV—IV of the diaphragm member of Figure 3 to illustrate the rubber and nylon fabric laminar construction of the diaphragm.

As shown on the drawings:

As shown in Figure 1, the reference numeral 10 designates a valve casing receiving a spring casing 11 on the top thereof and having screws 12 projecting through flanges or ears on the casing 11 and into the bosses on the casing 10.

The casing 10 has a valve seat 13 therein together with a valve stem guide 14 for coacting with a relief valve 15. The relief valve 15 has a head 15a cooperating with the seat 13 and a stem 15b cooperating with the guide 14.

The casing 10 also has a second valve seat 16 and a flap valve 17 is pivotally mounted in the casing for coacting with the seat 16. The valves 15 and 17 divide the interior of the casing 10 into two chambers 18 and 19. The chamber 18 communicates with the inlet side of the pump while the chamber 19 communicates with the discharge side of the pump. The flap valve 17 opens whenever inlet pressure in the chamber 18 is greater than discharge pressure in the chamber 19. The relief valve 15 opens whenever discharge pressure in the chamber 19 is above a predetermined pressure.

The casing 11 has a central cylindrical chamber 20 therethrough partially defined by a cylindrical skirt 21 depending into the casing 10. The casing 11 has an annular chamber 22 surrounding the skirt 21.

A spring retainer 23 is slidable in the cylindrical chamber 20 of the casing 11 and receives in threaded relation therethrough the shank of a stud 24. The stud 24 has a head 24a bottomed by an integral flange 25 which is seated on a shoulder 20a of the chamber 20. A washer 26 overlies the flange 25 and has a plurality of slots 26a around the aperture therethrough together with a key 26b seated in a keyway of the casing. The key 26b holds the washer against rotation. A snap ring 27 is snapped into a groove 20b of the chamber 20 to hold the flange 25 and washer 26 against axial movement relative to the casing. The head 24a of the stud 24 has a lock bar 28 pivoted therein adapted to be selectively seated in one of the slots 26a of the washer 26 to prevent the stud from being inadvertently rotated.

The casing 11 has an upstanding externally threaded collar portion 11a on the top thereof receiving, in threaded relation thereon, a cap 29.

The arrangement of the bar 28 is such that, when a screwdriver is inserted in the slot of the head 24a, the bar is automatically raised out of the washer slot 26a so that the stud can be rotated to slide the retainer 23 in the chamber 20.

A spring 30 is mounted in the chamber 20 and is bottomed at one end on the retainer 23 and at the other end on a metal cup member 31. This cup member, as best shown in Figure 3, has a bottom wall 31a receiving the spring thereagainst and a cylindrical side wall 31b for riding on the skirt 21 of the casing 11. The upper end of the cylindrical side wall 31b is curled as at 31c to provide a smooth bead therearound.

The spring 30 urges the cup member 31 toward the valve 15 to subject the valve 15 to spring pressure. The top of the valve head 15a has a central bead or button against which the bottom 31a of the cup 31 acts. As indicated above, the stud 24 controls the retainer 23 to move it toward and away from the bottom of the cup for regulating the compression of the spring 30 and thereby regulating the spring pressure on the valve 15.

In airplane fuel pumps, it is important that a constant selected presure differential be established by the pump, which pressure differential is based either on surrounding ambient air pressure or supercharger air pressure. In order to maintain this pressure differential, it is essential that the load of the spring 30 be the determining factor. For this purpose a diaphragm 32 is sealingly clamped around its outer peripheral portion between the casings 10 and 11 and is sealingly clamped around its inner peripheral portion on the cup 31.

The diaphragm 32 thus separates the chamber 18 of the casing 10 from the chamber 22 of the casing 11 and the chamber 22 is either vented to the ambient air through a port 11b or is connected by a tube secured in the port 11b with the interior of the supercharger compressed air duct.

The diaphragm 32 thus has one face thereof vented to base pressure in the chamber 22 and the other face thereof vented to the chamber 18.

According to this invention the diaphragm 32 in its free state, as shown in Figure 3, has a tapered relatively thin tubular portion 32a terminating at one end in an enlarged circular bead 32b and flaring outwardly at the other end as at 32c to a thickened flange 32d having a flat bottom face and an upstanding peripheral bead 32e.

The diaphragm 32 is molded from composite laminar synthetic rubber material which, as best shown in Figure 4, includes a main synthetic rubber body portion A, a thin nylon fabric portion B overlying the body portion A, and a thin, synthetic rubber covering C overlying the nylon fabric B. Rubber-like material capable of resisting aromatic fluids such as aircraft gasoline, and still maintaining high flexibility even at very low sub-zero temperatures, is used. The nylon fabric B strengthens the diaphragm 32 against bursting pressures, while the synthetic rubber, of course, renders the nylon fabric impervious to liquids and gases. The nylon is actually vulcanized to or imbedded in the rubber layers A and C. The thick rubber layer A is on the outer face of the diaphragm 32 which is exposed to the aromatic fuel in the chamber 18. The thin rubber layer C protects the nylon fabric B, provides resistance against bursting by supercharger air presure, and is exposed to the chamber 22.

The thickened flange portion 32d of the diaphragm 32, together with the raised bead 32a thereon, is seated in a counterbore 10a of the casing 10 as best shown in Figure 2 with the flat face of the thickened portion 32d bottomed on the bottom 10b of the counterbore.

The casing 11 has a tapered projecting pilot portion 11c extending into the counterbore 10a of the casing 10 and acting on the tapered inner face of the bead or lip 32e to seal the flange portion 32d between the casings 10 and 11.

As also shown in Figure 2, the thickened portion 32d terminates adjacent the inner walls of the casing so that the thinner flexible portion 32c of the diaphragm bridges the gap between the casing and the cup 31.

The tubular portion 32a of the diaphragm 32 snugly fits in the side wall 31b of the cup 31 and also snugly receives therearound a sealing ring or retainer ring 33. This ring 33, as shown in Figure 3, has an outwardly flared flange 33a at one end thereof, a rounded curled portion 33b at the other end thereof, and an intermediate outwardly bulged bead 33c.

Substantially cylindrical inner wall portions 33d are provided at both ends of the bulged portion 33c for snugly fitting on the outer wall of the diaphragm tubular portion 32a. The flange 33a fits over the bead 32b of the diaphragm, while the curled portion 33b provides a smooth, rounded surface which will prevent damage to the diaphragm if it operates thereover.

The sealing ring or retainer 33 is initially slipped over the tubular portion 32a of the diaphragm, and the diaphragm with the sealing ring therearound is then slipped over the cup 31 to a desired level on the side wall 31b of the cup. The selected level is preferably such that the diaphragm will bulge upwardly between the casing walls and cup when installed in the casings. When positioned at the desired level, the cup is then expanded to form a bead or bulge 31d on its side wall 31b conforming with the bead or bulge 33c of the sealing ring 33 and holding the sealing ring against sliding movement relative to the cup while clamping the diaphragm thereon in sealing relation.

The bead 32b will prevent the diaphragm from being pulled through the sealing ring 33 and serves to locate the tubular portion 32a of the diaphragm with respect to sealing ring 33 in assembly. The thin bridging and outwardly flaring portion 32c of the thin diaphragm wall 32a which extends across the space between the cup 31 and the casing is free to roll on and off of the cup 31 and on and off of the casing walls during movement of the cup in response to fluctuations of the valve 15. The thin bridging section 32c, however, will not stick to the casings or cup, and will not interfere with free movement of the cup even at very low temperatures. Normally the portion 32c does not contact the casing walls.

The natural outward flare of the bridging portion 32c makes for the easy and free movement of the tubular wall portion 32a through the flange 32d since it is readily bowed up as shown in Figure 2. The tubular wall portion 32a easily rides off of the cup side wall 31b to become part of the bridging section as the valve 15 is opened.

In the event that the bridging portion is deflected against the sealing ring 33, the curled portion 33b provides a smooth surface against which the diaphragm can act without being damaged. Likewise, the beaded or curled portion 31c of the cup can receive the diaphragm thereagainst without damaging the diaphragm since it presents a smooth surface to the diaphragm.

Since the diaphragm may be secured on the cup at any desired level, it can be of a standard size and still be used on cups of different lengths.

From the above descriptions, it will thus be understood that the invention provides an improved diaphragm and valve assembly especially useful in aircraft fuel systems. The diaphragm material is strongly resistant to bursting pressures and highly resistant to the softening action of solvents such as gasoline. The diaphragm has a very thin flexing portion which does not interfere with free operation of the valve even at very low sub-zero temperatures.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A valve for an aircraft fuel pump including a valve casing having a counterbore in the upper end thereof, a spring casing having a pilot portion projecting into said counterbore, a relief valve in said valve casing, a cup member sliding on said spring casing, a spring acting on said cup to urge the relief valve to closed position, a diaphragm separating the valve casing from the spring casing and having a thickened marginal flange seated in said counterbore of the valve casing and acted on by the pilot portion of the spring casing to form a seal with the casing, said diaphragm having a thin-walled flexible tubular portion snugly embracing the cup, a bead on said tubular portion, a sealing ring surrounding said tubular portion and bottomed by said bead, said sealing ring having an outwardly bulged portion, said cup having a mating bulged portion for clamping the diaphragm against sliding movement on the cup, and said diaphragm having a looped bridging portion connecting the tubular portion with the flanged portion thereof and adapted for free flexing movement in response to movement of the cup.

2. In an aircraft fuel pump relief valve assembly including a pair of mating casings and a cup member having a side wall slidable on one of the casings, a resilient rubber material diaphragm having its outer periphery clamped between the casings and having a tubular portion with a beaded end snugly embracing the side wall portions of the cup, a sealing ring surrounding said tubular portion in abutting relation to said beaded end, said ring having an outwardly bulged circumferential portion, the cup being expanded to deflect a part of its intermedial surface into the ring bulge to lock the diaphragm between the ring and the cup, said ring being cooperable with said cup anywhere along the length of the side wall of the cup.

3. In an aircraft fuel pump relief valve assembly including a pair of mating casings and a cup member slidable on one of the casings, a resilient diaphragm clamped between the casings and having a tubular portion snugly embracing the cup, and a sealing ring surrounding said tubular portion, said ring having an outwardly bulged circumferential portion, the side wall portion of the cup being expanded to deflect a part of its intermedial surface into the ring bulge to lock the diaphragm between the ring and the cup, said ring being cooperable with said cup anywhere along the length of the cup, a margin of the ring being curled to offer a smooth curved surface to the diaphragm in the event pressure conditions are such as to deflect the diaphragm against the ring.

4. The method of mounting an outwardly flanged tubular flexible rubber material diaphragm relative to a valve and receiving wall of a casing in a pump or the like which comprises surrounding a tubular portion of the diaphragm with a ring having an inwardly opening recess, inserting a tubular cup through the diaphragm, bottoming the cup on a valve in a casing having a surrounding wall with a receiving ledge for the diaphragm flange, seating the periphery of the diaphragm flange on the ledge of said casing wall, sliding the diaphragm on the cup to form a bulge in the portion of the diaphragm bridging the space between the ledge and the cup, and locally expanding an intermediate portion of the cup to move a portion of the diaphragm into the recess of the ring for locking the diaphragm and ring in sealed assembly with the cup.

HARLAND E. JACOBUS.

(References on following page)

REFERENCES CITED

The following references are of record in the file of this patent:

UNITED STATES PATENTS

| Number | Name | Date |
|---|---|---|
| 255,914 | Bergen | Apr. 4, 1882 |
| 768,984 | George | Aug. 30, 1904 |
| 1,025,986 | Lester | May 14, 1912 |
| 1,366,473 | Mallory | Jan. 25, 1921 |
| 1,484,140 | Mallory | Feb. 19, 1924 |
| 1,515,702 | Reybold | Nov. 18, 1924 |
| 1,525,426 | Mueller | Feb. 3, 1925 |
| 1,597,206 | Mallory | Aug. 24, 1926 |
| 1,705,622 | Mallory | Mar. 19, 1929 |
| 1,933,085 | Barchard | Oct. 31, 1933 |
| 2,268,805 | Curtis | Jan. 6, 1942 |
| 2,299,079 | Davis | Oct. 20, 1942 |
| 2,349,435 | Keefe | May 23, 1944 |
| 2,365,063 | Downey | Dec. 12, 1944 |
| 2,400,861 | Wolcott | May 21, 1946 |

FOREIGN PATENTS

| Number | Country | Date |
|---|---|---|
| 345,957 | Germany | Dec. 22, 1924 |
| 584,025 | Germany | Sept. 13, 1933 |